Patented Jan. 10, 1950

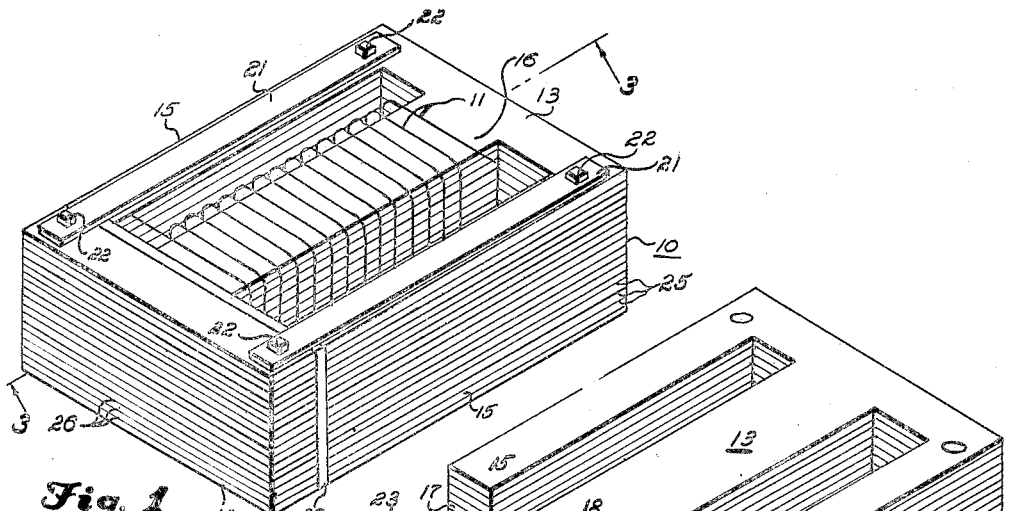
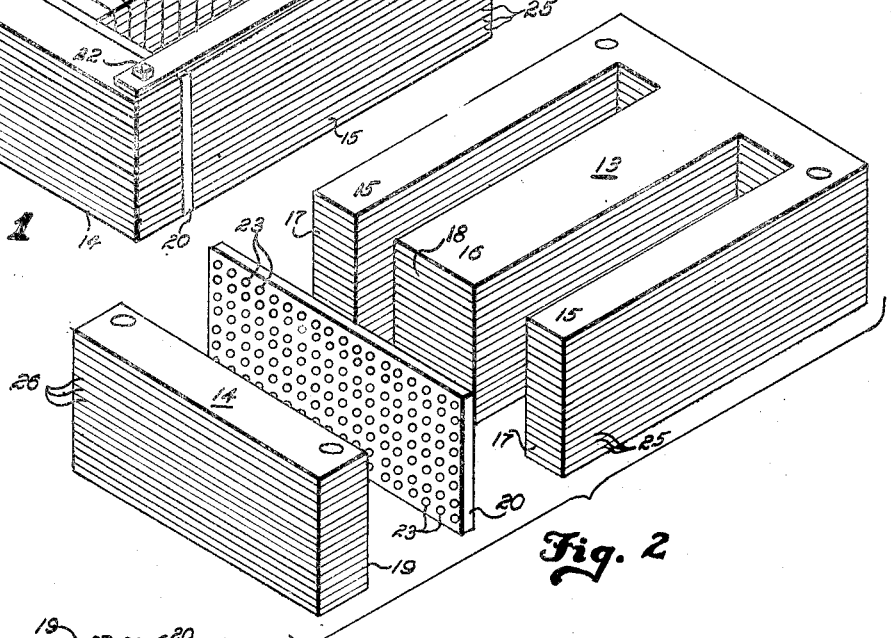
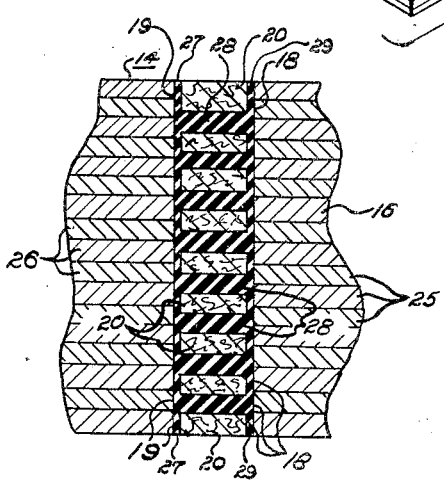

2,494,180

UNITED STATES PATENT OFFICE 2,494,180

LAMINATED REACTOR

William F. Koubek, Cuba, N. Y., assignor, by mesne assignments, to Acme Electric Corporation, a corporation of New York Application April 6, 1946, Serial No. 660,092

2 Claims. (Cl. 175—356)

My invention relates to a perforated non-magnetic air gap spacer and a bonding material between the cores of a reactor or other flux conducting structures to join the laminated cores together and thereby prevent excessive noise and audible humming.

In many applications where A. C. reactors are used, it is desirable to incorporate an air gap in the magnetic circuit in order to provide relatively constant inductance regardless of the change of flux density either on an average basis or on an instantaneous basis. When such an air gap is provided, particularly in the case of a laminated core, serious difficulty is encountered with audible hum and noise set up by the vibration of the separate laminated cores.

One of the objects of my invention is to reduce the noise level of this audible hum set up by the vibration of the separate laminated cores in the reactor by binding the laminated cores together with a bonding material which adheres to the abutting edges of the laminated cores.

Another object of my invention is the provision of a bonding material adhering to the abutting edge portions of laminated cores for joining the cores together in a flux conducting structure.

A further object of my invention is the provision of a flux conducting structure having a perforated spacer between the laminated cores in the flux conducting structure and a bonding material adhering to the edge portions of these laminated cores and extending through the openings in the perforated spacer.

Other objects and a fuller understanding of my invention may be had by referring to the following description and claims, taken in conjunction with the accompanying drawing, in which:

Figure 1 of my drawings represents a reactor in which my invention may be incorporated;

Figure 2 is an exploded view of Figure 1 to better illustrate the perforated air gap spacer; and Figure 3 is an enlarged fragmentary cross-sectional view taken along the line 3—3 of Figure 1.

Many different methods have been tried with the aim in mind of reducing to a minimum the audible hum or noise level of reactors. I accomplish a reduction in noise level by incorporating in the air gap space a perforated spacer and a bonding material which adheres to the abutting edges of the laminated cores and extends through the openings in the perforated spacer. Throughout my description I use the perforated air gap spacer and the bonding material in connection with a reactor. The term reactor is being used in a very broad sense to include transformers, chokes, or any other electrical device having a flux conducting structure. The reactor, as herein described for the purpose of defining my invention, comprises generally a flux conducting structure 10 and a coil of wire 11. This coil of wire 11, shown symbolically in Figure 1 of my drawing, may be of any suitable design and connected by electrical means to an electrical circuit.

As is best illustrated in Figures 1 and 2, the flux conducting structure 10 includes an E-shaped laminated core 13 and an I-shaped laminated core 14. The E-shaped laminated core has end legs 15 and a center leg 16 terminated in end portions 17 and 18 respectively. The I-shaped laminated core 14 has an abutting edge portion 19 spaced from the end portions 15 and 16 of the E-shaped laminated core by a perforated non-magnetic air gap spacer 20. Non-magnetic strap means 21 are fastened to the E-shaped laminated core 13 and the I-shaped laminated core 14 by bolts 22 or other suitable means to fasten the cores together to form a flux conducting structure 10.

The perforated spacer 20 may be constructed of any suitable material such, for example, as paper, fibers, or other non-magnetic or non-ferrous material. The purpose of the spacer is to regulate the distance between the laminated cores and thereby provide an air gap of the desired size in the magnetic circuit of the flux conducting structure. This perforated spacer 20 has openings or perforations 23, illustrated in Figure 2 as having circular cross section. However, the design and shape of these openings or perforations 23 in the perforated spacer 20 is immaterial and slight changes from the preferred design illustrated in my drawings may be made without departing from the scope of my invention.

The ends of the individual laminations 25 of the E-shaped laminated core 13, which constitute the end portions 17 and 18 and the edges of the individual laminations 26 of the I-shaped laminated core 14 are joined together by a bonding material 27. As is best illustrated in Figure 3, this bonding material 27 has a joining portion 28 thereof which extends through the perforations 23 in the perforated spacer 20. The thickness of the adhering portion 29, of the bonding material 27 between the perforated spacer 20 and the abutting edge portions 18 and 19 of the laminated cores 14 and 16, is greatly exaggerated in Figure 3. Actually the total distance between the abutting edge portions 18 and 19 of the laminated cores is substantially equal to the thickness of the perforated spacer 20.

As previously set forth, the bonding material 27 is employed to bind together the individual laminations of the laminated cores, and also to bind together the laminated cores. In actual practice, I have found that shellacs, varnishes, and other similar composition used in the art of manufacturing electrical appliances, are satisfactory as a bonding material for the binding operation. Also, I have found that natural and synthetic rubbers and rosins of a thermo-setting nature, or natural or synthetic products of a polymerizing or copolymerizing nature are satisfactory. It is understood, that the bonding material used may be selected for particular circumstances, and that any material which can be placed on the laminated core abutting edges in a fluid or plastic condition, and thereafter caused to harden into a binding mass by evaporation, thermo setting, polymerizing or copolymerizing will serve the purpose of the bonding material.

The bonding material 27 joins together the ends of the individual laminations in the laminated core. The joining portion 28 of the bonding material 27, or that portion which extends through the openings or perforations 23 of the perforated spacer 20 binds the abutting edge portions of the laminated cores together.

The use of the perforated air gap spacer between the laminated cores permits the bond between the laminated cores by the bonding material as well as the bond between the individual laminations in these laminated cores, and also provides a non-magnetic gap therebetween. This bonding of the laminations and laminated cores greatly reduces the audible hum set up by the vibration of the separate laminated cores.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An E-I laminated reactor comprising, a plurality of E-shaped magnetic laminations each having end legs and a center leg, each of said legs defining an end edge, a plurality of I-shaped magnetic laminations each having a side edge facing the end edges of the leg of an E-shaped lamination, a non-magnetic perforated spacer separating the end edge of each of the legs of each of the plurality of E-shaped laminations from the side edge of each of the plurality of I-shaped laminations, and a vibration dampening bonding non-magnetic material extending through the perforations in the spacer and adhering to the end edge of each of the legs of each of the E-shaped laminations and also adhering to the side edge of each of the I-shaped laminations.

2. A laminated reactor comprising, a plurality of magnetic laminations disposed to form a pair of laminated cores, each of said magnetic laminations having an edge with the edges of the magnetic laminations in one core facing the edges of the magnetic laminations in the other of the pair of cores, a non-magnetic perforated spacer separating the edge of each of the laminations of one core from the edge of each of the laminations of the other core, and a vibration dampening bonding non-magnetic material extending through the perforations in the spacer and adhering to the edge of each of the laminations of each of the cores.

WILLIAM F. KOUBEK.

REFERENCES CITED

The following references are of record in the file of this patent:

UNITED STATES PATENTS

| Number | Name | Date |
| --- | --- | --- |
| 1,420,989 | Fondiller | June 27, 1922 |
| 2,293,951 | Seastone et al. | Aug. 25, 1942 |
| 2,312,140 | Welch, Jr. | Feb. 23, 1943 |
| 2,318,095 | Putman | May 4, 1943 |
| 2,320,922 | Ford | June 1, 1943 |
| 2,367,591 | McAllister | Jan. 16, 1945 |
| 2,372,074 | Ford | Mar. 20, 1945 |